(12) United States Patent
Ward et al.

(10) Patent No.: US 8,990,174 B2
(45) Date of Patent: Mar. 24, 2015

(54) SYSTEM AND METHOD FOR IDENTIFYING MEDIA ASSETS

(75) Inventors: Peter Ward, Manhattan Beach, CA (US); JR Yasgur, Culver City, CA (US)

(73) Assignees: Sony Corporation, Tokyo (JP); Sony Pictures Technologies Inc., Culver City, CA (US)

( * ) Notice: Subject to any disclaimer, the term of this patent is extended or adjusted under 35 U.S.C. 154(b) by 3 days.

(21) Appl. No.: 12/964,169

(22) Filed: Dec. 9, 2010

(65) Prior Publication Data
US 2012/0150927 A1  Jun. 14, 2012

(51) Int. Cl.
*G06F 17/30* (2006.01)
*G06F 21/10* (2013.01)
*H04N 21/2343* (2011.01)
*H04N 21/81* (2011.01)

(52) U.S. Cl.
CPC .......... *G06F 17/30038* (2013.01); *G06F 21/10* (2013.01); *G06F 21/105* (2013.01); *H04N 21/23439* (2013.01); *H04N 21/8126* (2013.01); *G06F 2221/0737* (2013.01)
USPC ........................................................ 707/695

(58) Field of Classification Search
USPC ........................................ 707/695, 705, 706
See application file for complete search history.

(56) References Cited

U.S. PATENT DOCUMENTS

| 7,567,969 | B2 * | 7/2009 | Murotani et al. ...................... 1/1 |
| 7,961,938 | B1 * | 6/2011 | Remedios ...................... 382/162 |
| 2005/0166047 | A1 * | 7/2005 | Tollett ........................... 713/167 |
| 2006/0265421 | A1 * | 11/2006 | Ranasinghe et al. ........ 707/104.1 |
| 2007/0073626 | A1 * | 3/2007 | Reeder et al. ................... 705/59 |
| 2009/0142042 | A1 * | 6/2009 | Branam ........................ 386/124 |
| 2010/0161575 | A1 * | 6/2010 | Basso et al. .................. 707/705 |
| 2011/0040754 | A1 * | 2/2011 | Peto et al. ..................... 707/736 |

* cited by examiner

*Primary Examiner* — Hung Q Pham
(74) *Attorney, Agent, or Firm* — Frommer Lawrence & Haug LLP; William S. Frommer

(57) ABSTRACT

A system and method for organizing media assets of a media project. The method includes storing a plurality of versions of media assets of the media project, including an original version of the media asset and at least one modified version of the media asset. Each of the plurality of versions of the media assets include a plurality of components, and the modified versions of the media assets include at least one modified component. Metadata for each of the plurality of components is generated. The metadata indicates whether each of the plurality of component is a modified component, and the metadata of the modified component indicates a type of modification made to the modified component.

9 Claims, 5 Drawing Sheets

SYSTEM AND METHOD FOR IDENTIFYING MEDIA ASSETS

BACKGROUND

1. Field of the Invention

This invention relates generally to identifying media assets. More particularly, the present invention relates to utilizing characteristics of a version of a media asset to identify and search a version of the media asset.

2. Background Discussion

Typically, a media asset, such as a movie production or album, is released to the public as a particular version. Following the initial release, it may be necessary to re-release the media asset in a slightly different form, or version. This new version of the asset may be the result of editing portions of violent content, translating the movie or album into a different language, modifying the credits and other similar changes.

SUMMARY

Thus, embodiments of the present invention are directed to organizing metadata associated with an edited version of a media asset (motion picture, television show, recording album) that identifies criteria that the edited version of the asset satisfy. These concepts also apply to any/all versions of the asset, not only "edited" versions The metadata provides a structured/normalized/standardized schema to classify the attributes and criteria of the media asset. This metadata schema is helpful to the accurate and efficient identification, recall, and exploitation of media assets in an array of workflows. Furthermore, this standardized and comprehensive classification of version attributes is useful for automated content identification, retrieval, and transformation.

Following the initial release of a media asset, it may be necessary to re-release the media asset in a slightly different form, or version. This may occur at or after initial release. Multiple versions may be cut for the initial theatrical release as well. This new version of the asset may be the result of editing portions of violent content, translating the movie or album into a different language, modifying the credits and other similar changes. Typically, this new version of the asset is the result of editing content for territory (e.g., UK, Germany) and/or platform (e.g., television broadcast (TNT, HBO), digital distribution (iTunes, Hulu)). These standards and practices edits may alter picture and/or audio for content (e.g., violence, nudity, profanity), runtime, rating, etc. Content may also be edited based on talent requests and/or restrictions (e.g., Director's Home Entertainment cut, scenes only approved for distribution in particular territories). Furthermore, the media asset may be edited as a result of distribution agreements (e.g., logo placement on shared-rights titles). While editing the asset is time consuming and expensive, it is also difficult to keep track of multiple versions of the same asset to confirm that a version confirms to particular criteria. Indeed, many times there will only be relatively minor changes from the original media asset and a modified version and there is no way to track each modification of the edited version relative to the original. Some edits are tracked relative to the original version, while other changes are tracked without a reference to an "original" cut. The concept of an "original version" is one with many interpretations and definitions.

Metadata, associated with the version of the media asset, provides a structured/normalized/standardized schema to classify the attributes and criteria of the media asset. This metadata schema is useful to the accurate and efficient identification, recall, and exploitation of media assets in an array of workflows. Furthermore, this standardized and comprehensive classification of version attributes is useful for automated content identification, retrieval, and transformation.

One embodiment of the present invention is directed to a method for organizing media assets of a media project. The method includes storing a plurality of versions of media assets of the media project, the plurality of versions of the media assets including an original version of the media asset and at least one modified version of the media asset. Each of the plurality of versions of the media assets include a plurality of components, and the modified versions of the media assets include at least one modified component that has been modified from the corresponding component of the original version of the media asset. Next, metadata for each of the plurality of components is generated. The metadata indicates whether each of the plurality of component is a modified component, and the metadata of the modified component indicates a type of modification made to the modified component.

Another embodiment of the present invention is directed to the method as recited above and the media project is a movie, a television program, audio data, or software.

Another embodiment of the present invention is directed to the method recited above wherein the plurality of components includes media type, territory, picture, audio, content and color.

Another embodiment of the present invention is directed to the method recited above wherein the metadata of the modified component includes additional data that describes differences between the modified component and the corresponding component of the original version of the media asset.

Another embodiment of the present invention is directed to the method recited above wherein the differences include component addition, component deletion and component substitution.

Another embodiment of the present invention is directed to the method recited above and also includes displaying the metadata.

Another embodiment of the present invention is directed to a method for selecting a plurality of versions of a particular media asset. This selection method includes designating, from a plurality of versions of the media asset, a particular version of the media asset based on a plurality of search criteria set by a user. The plurality of search criteria includes a plurality of metadata corresponding to a plurality of components included in the particular version with a metadata requirement designated by a user. The plurality of versions include an original version and a plurality of modified versions and the metadata requirement designated by the user includes metadata requirement selected by the user for each of the plurality of components. Each of the plurality of modified versions includes at least one modified component which is different from the corresponding component of the original version. The metadata is generated for each of the plurality of components and the metadata indicates whether each of the plurality of component is modified, and the metadata of the modified component indicates modifications made to the modified component.

Another embodiment of the present invention is directed to the selection method described above wherein the media project is a movie, a television program, audio, or software.

Another embodiment of the present invention is directed to the selection method described above wherein the plurality of components include media type, territory, picture, audio, content and color.

Another embodiment of the present invention is directed to the selection method described above wherein the metadata of the modified component includes specific notes describing the difference between the modified component and the corresponding component of the original version of the original version of the media asset.

Another embodiment of the present invention is directed to the selection method described above wherein the described difference includes component addition, component deletion and component substitution method for selecting a plurality of versions of a particular media object.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
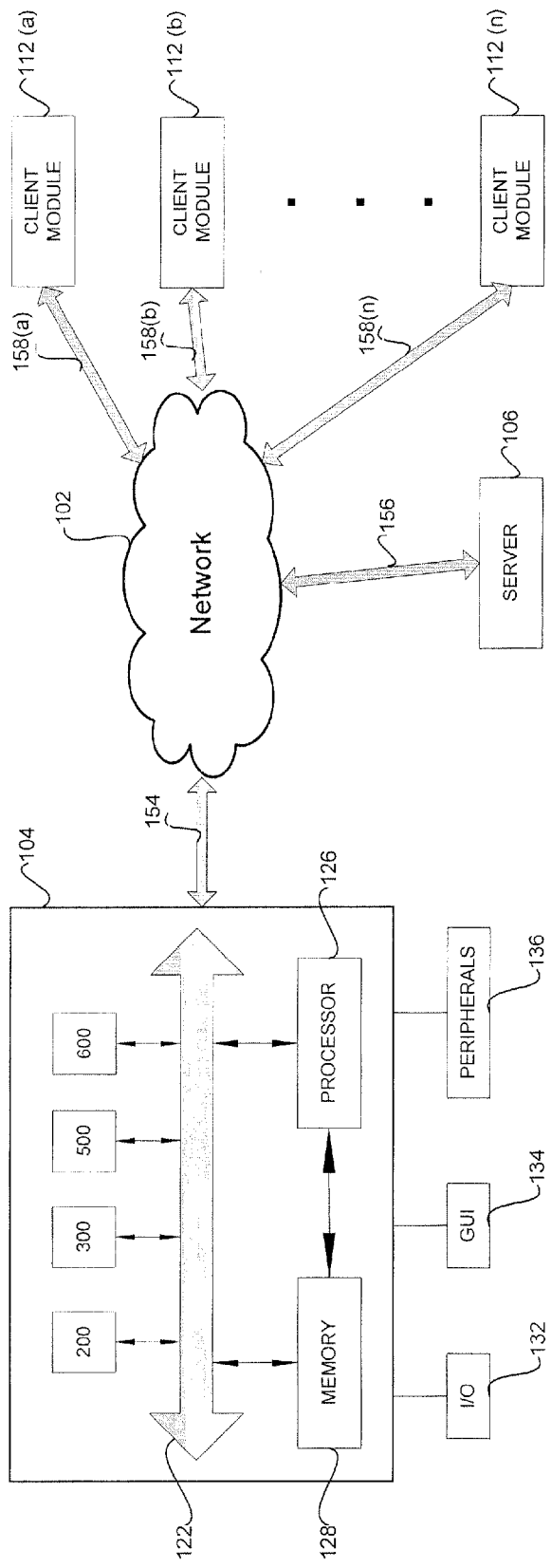
FIG. 1 illustrates an example of a system used to implement one embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The term "component" as used herein, while defined above, is not limited to "a computer-related entity". For example, as used herein, the term "component" is itself an asset, such as a media asset. Components can be picture, audio, and/or text files (e.g., subtitles, closed caption files). Furthermore, these may be components of the full-length non-episodic or episodic program. They may also be components of made-for-digital content, short-form content (e.g., made-for-digital series, minisodes), and supporting materials (e.g., trailers, teasers, value added materials). Components can be stored on numerous media, both physical and digital. Media can include, but is not limited to: film, video tapes (of numerous varieties), audio tapes (of numerous varieties), text files (of which there are numerous file types), images (e.g., jpgs, pngs), and digital files (e.g., J2Ks, mwvs, ProRes files, audio formats), etc. Physical assets may be stored in traditional storage locations (e.g., vendors, vaults). Digital assets may be stored on studio-hosted servers, $3^{rd}$ party-hosted servers, external hard drives, etc. Components may also include the technical and descriptive metadata required for internal workflows and client delivery. Examples of technical and descriptive metadata may include: title, synopsis, talent, credits, runtime, color. The metadata about the versions of these content types may be stored, in several systems. The systems of record for most metadata are database/software systems (e.g., GPMS, GOLD). This metadata is sent to other systems and entities either via established interfaces (e.g., vendor inventory systems, the Distribution Backbone), and/or extra-system reports. The term component also includes sections, or pieces or constituent portions of music products, games, electronics, etc.

The components also apply to full-length programs as well as supporting materials (e.g., trailers, teasers, EPKs (electronic press kits), value added materials). This also includes "movie productions" as well as non-episodic content (e.g., feature films, mini-series, movies of the week (MOWs)), episodic content (e.g., television series), and made-for-digital content (e.g., Crackle original series, minisodes), and the aforementioned supporting materials.

These concepts apply to original productions (e.g., studio titles). This may also apply to additional documents, such as documents that may be classified according to these metadata structures. Such documents may include, for example, scripts, music cue sheets, etc. All content, metadata, and concepts may be deployed worldwide.

Other embodiments of the present invention include the methods described above but implemented using apparatus or programmed as computer code to be executed by one or more processors operating in conjunction with one or more electronic storage media.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media. This electronic storage media may include, for example a non-transitory electronic storage medium/media such as a register, or other electronic repository or electronic storage location for data that is capable of storing data represented in electronic form, such as bits, bytes, kilobytes, waveforms, electronic signals, digital format and other data types and forms.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

FIG. 1 illustrates an example of a system 100 that supports embodiments of the present invention. The system 100 shown in FIG. 1 includes a network 102, a processing module 104, a server 106, and one or more client modules 112(a), 112(b) . . . 112(n) (where "n" is any suitable number).

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers.

The processing module 104 includes componentization module 200, component level module 300, asset management module 500, version modification module 600, memory 128 and processor 126. These elements, or modules, may be operatively coupled by a bus 122. The modules, such as a componentization module 200, asset management module 500, version modification module 600 may be for example, non-transitory electronic storage registers that operate in conjunction with a processor, such as 126, or other processors as shown and described herein to perform the function of the algorithm, or program code stored therein. Also shown in FIG. 1 are I/O (input/output) module 132, GUI 134 and peripherals 136. The modules as described as stored in memory 128 are typically program code that execute instructions stored on a non-transitory, computer-readable medium and are software components that operate with hardware components.

The server module, or facility, or unit, 106 is typically one or more processors with associated memory, such as computers, or other processing devices such as a desktop computer, laptop computer, personal digital assistant (PDA), wireless handheld device, cellular telephone, or the like. The server module 106 is capable of processing and storing data or merely capable of accessing processed and stored data from another location (i.e., both thin and fat terminals).

Client modules 112(a) . . . (n) (generally referred to as 112, herein) typically include devices with processing capabilities and memory and an output displays, such as, laptop computers, desktop computers, cell phone, personal digital assistant (PDA), wireless handheld device, PLAYSTATION™, PSP™ and the like. The client modules 112 may be capable of processing and storing and displaying data themselves or merely capable of accessing processed and stored data from another location (i.e., both thin and fat terminals) and displaying the accessed or retrieved data. It is also an embodiment of the present invention that the functionality of server 106 could also be part of server 106 and/or client device, or terminal 112.

Server module 106, processor module 104 and terminals 112 are coupled to network 102 via an associated bi-directional communication medium, 156, 154 and 158, respectively, which may be for example a serial bus such as IEEE 1394, or other wire or wireless transmission medium. The processing module 104, server module 106, and the client terminal 112 may be communication appliances, or user locations, or subscriber devices.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

Figure 2:
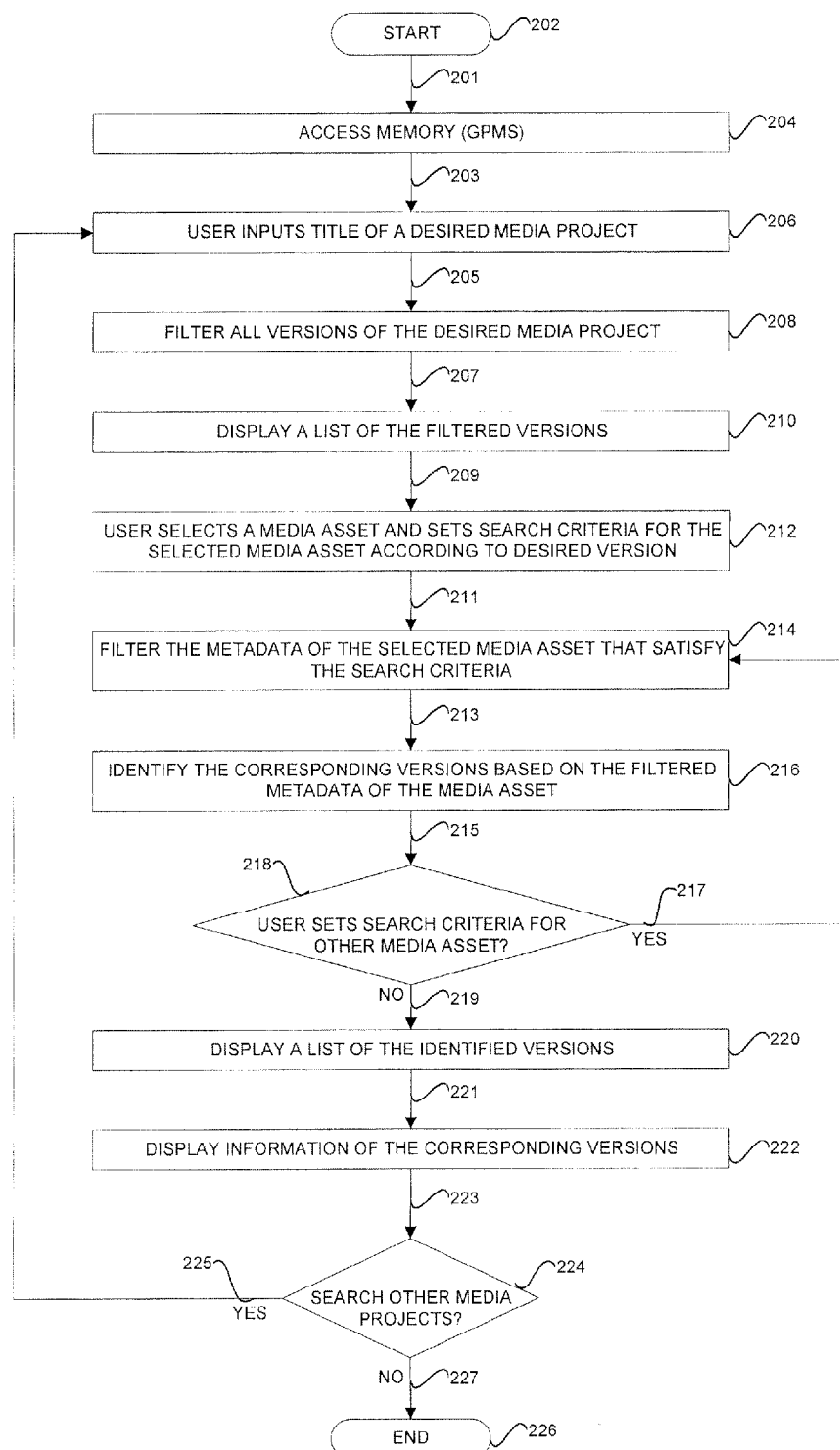
FIG. 2 illustrates an example of a series of steps for an embodiment of the present invention.

FIG. 2 illustrates an example of a series of steps 200 for an embodiment of the present invention. The series of steps 200 may be stored on a non-transitory computer readable medium or media (e.g., RAM, ROM, EEPRPOM, DRAM or other memory, electronic storage device or registry) and may be executed by a processor or plurality of processors. The steps 200, may be computer code or other program code (e.g., source code) that may be compiled into object code. The code, stored on a medium and/or accessed, is a module.

Generally, FIG. 2 shows, program code, or steps 200 of a media project searching process that: filters all versions of a desired media project; filters metadata of a plurality of media assets; associates the filtered metadata with the corresponding versions and displays related information of the associated versions. This computer code, or algorithm, may be stored in memory module 200 shown in FIG. 1.

Specifically, FIG. 2 shows that program code 200 begins with step 202. Line 201 shows that in step 204 a memory location is accessed. This memory location may be a remote storage or data base such as, for example, GPMS database.

Line 203 shows that in step 206 a user inputs the title of a desired media project. For example, if the user wants to search a particular version of a movie, he/she may input the name of the desired movie, such as "Spider-man 2".

Line 205 shows that in step 208 all the versions of the desired media project are filtered according to the title of the media project from all the media projects.

Line 207 shows that in step 210 a list of the filtered version is displayed.

Line 209 shows that in step 212 the user selects a media asset and sets search criteria for the selected media asset of the media project according to the desired version. For example, if the user wants to search a version of Spider-man 2 which is made for theatrical, he/she may first select media asset "Media Type", and set the search criteria as "Theatrical".

Line 211 shows that in step 214 the metadata of the selected media asset that satisfies the search criteria is filtered from all the metadata.

Line 213 shows that in step 216 the corresponding versions are identified based on the filtered metadata of the selected media asset.

Line 215 shows that in step 218 a determination is made whether the user sets more search criteria for other media assets. For example, if the user still wants to search a version of the movie "Spider-man 2" which is made for U.S. domestic, he/she may select media asset "Media Territory", and set the search criteria as "Domestic". In this case, "yes" line 217 leads back to step 214. If not, "no" line 219 shows that in step 220 a list of identified versions is displayed.

Line 221 shows that in step 222 information about the identified versions is displayed.

Line 223 shows that in step 224 a determination is made whether the user wants to search other media projects. For example, if the user still wants to search other movies, "yes" line 225 leads back to step 206. If not, "no" line 227 leads to an end step 226.

Figure 3:
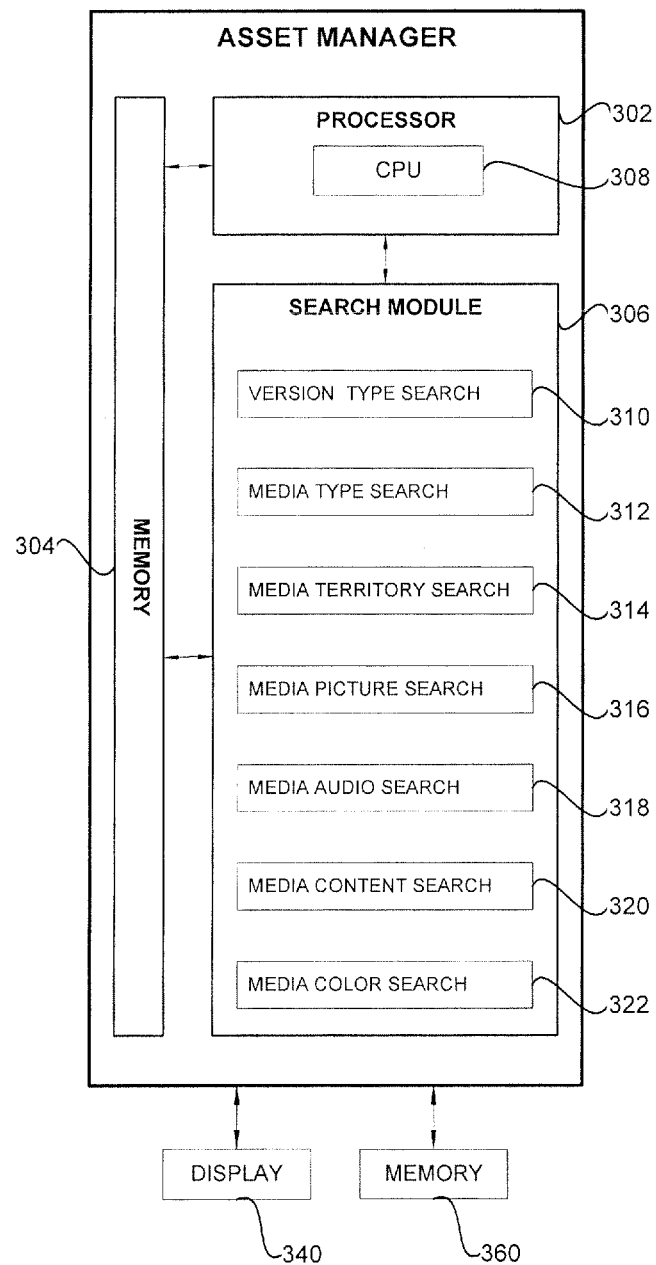
FIG. 3 illustrates an example of an asset manager according to an embodiment of the present invention.

FIG. 3 illustrates an example of an asset manager module 300 according to an embodiment of the present invention. Asset management module 300 includes a processor module 302, a memory module 304 and a search module 306. The asset management module 300 may be a module, "plug-in" unit, stand-alone unit or other facility that resides on another module or device. For example, asset manager module may be a component of, or executed by: client module(s) 112; server 106; and/or processing module 104, as described herein. Also components of the asset manager module 300 are display module 340 and remote memory 360.

Processor module 302 is coupled to the search module 306 via an associated communication link to enable processor module 302 and memory 304 to coordinate processing operations of the modules shown in FIG. 3. The processor module 302 includes a CPU 308, which is typically a processor that includes an arithmetic logic unit (ALU), which performs arithmetic and logical operations, and a control unit (CU), which extracts instructions from memory and decodes and executes them, utilizing the ALU when necessary. An I/O interface may be used to operatively couple the components of processor module 302.

Memory module 304 stores programs, which include, for example, a web browser, algorithms, as well as typical operating system programs (not shown), input/output (I/O) programs (not shown), BIOS programs (not shown) and other programs that facilitate operation of asset manager module 300. The web browser (not shown) is for example an Internet browser program such as Internet Explorer™. Memory module 304 may be, for example, an electronic storage medium, such as an electronic storage repository that can store data used by asset management module 300. The memory module 304 may include, for example, RAM, ROM, EEPROM or other memory media, such as an optical disk, optical tape, CD, or a floppy disk, a hard disk, or a removable cartridge, on which digital information is stored in the form of bits. The memory module 304 may also be remote memory coupled to processing module 302 via wired or wireless bi-directional communication medium.

Search module 306 includes all the asset management functionality of various levels. For example, search module 306 includes version type search module 310, media type search module 312, media territory search module 314, media picture search 316, media audio search 318, media content search 320 and media color search 322.

Version type search module 310 is used to search for a conforming media project version based on a media project type identification. This version type identification may include program, software, program code, stored on a non-transitory, or tangible recording medium. The version media type identification may also be data stored in a memory, or register or other memory location.

Media type search module 312 is used to search for a conforming media asset based on a type identification. This type identification may include audio, video, television, news reel, text, image or other content or storage information. This may also include image data, audio data, scene data, starting point data, ending point data, content-related data and other information associated with a media asset.

Media territory search module 314 is used to search an asset based on territory, such as a country, geographic region or other virtual or actual location.

Media picture search module 316 is used to search for an asset based on picture data associated with the asset. This picture data may include motion picture data, television program data, software, program code, or other electronic or video data.

Media audio search module 318 is used to search assets based on audio content. This may include the soundtrack or individual audio components of the media asset.

Media content search module 320 is used to search for a media asset based on the content of the asset and media color search module 322 is used to search for a media asset based on color of the asset. This may be used to distinguish between a "black and white" version of a movie or television show and a "color" version of the movie or television show.

Figure 4:
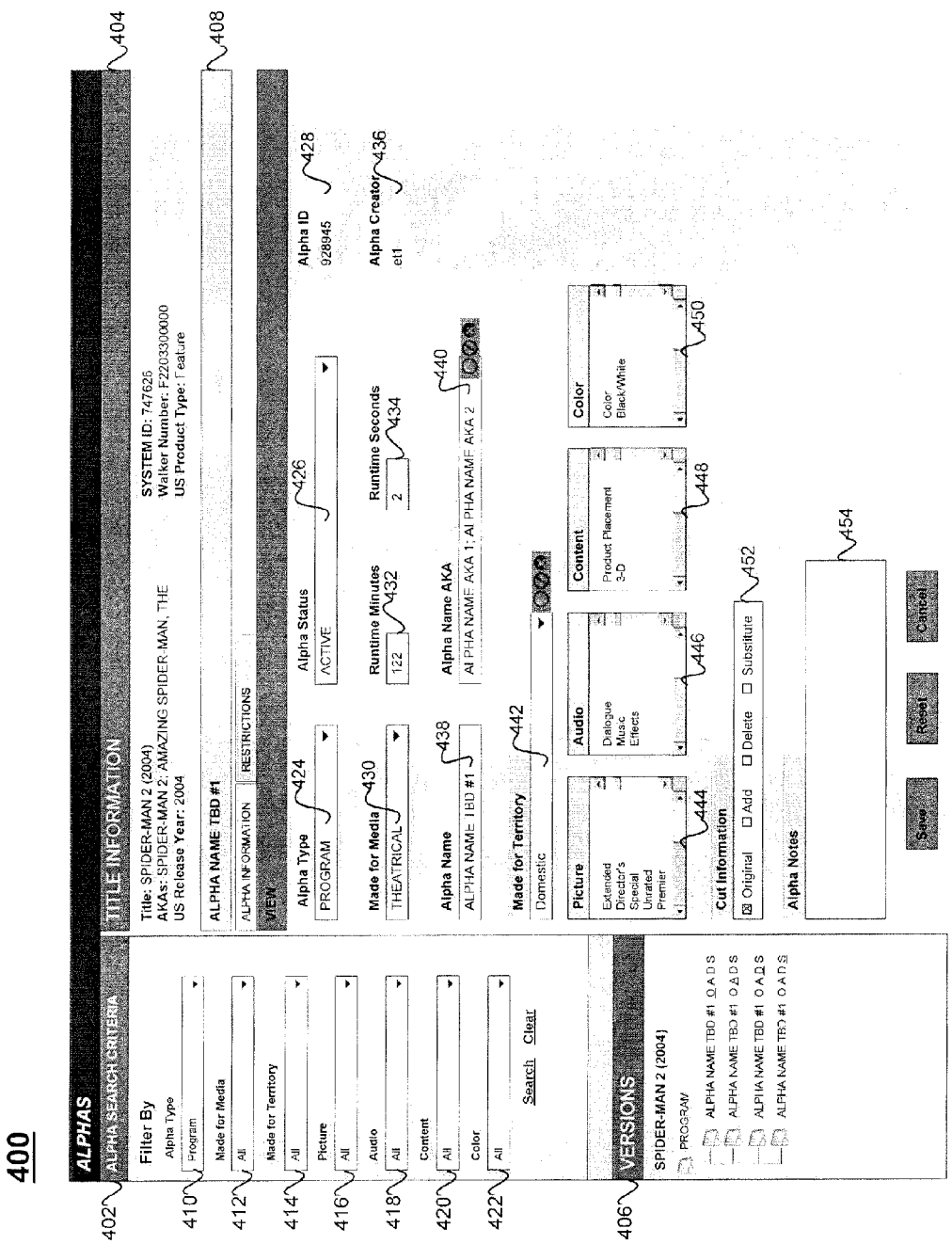
FIG. 4 illustrates an example of a screenshot of a display according to an embodiment of the present invention.

FIG. 4 illustrates an example of a screenshot of a system according to an embodiment of the present invention. Screenshot 400 shows a system that may executes media asset identification process. Block 402 shows the search criteria set by the user by selecting a desired item from the pull-down menus 410-422. In the pull-down menu 410 the user may select the desired version type/Alpha type, such as "program", as the search criteria. Similarly, pull-down menu 412 shows the media type search criteria set by the user, pull-down menu 414 shows the media territory search criteria, pull-down menu 416 shows the media picture search criteria, pull-down menu 418 shows the media audio search criteria, pull-down menu 420 shows the media content search criteria, and pull-down menu 422 shows the media color search criteria.

As shown in block 404, title information of the desired media project is displayed. For example, if the user wants to search a particular version of movie "Spider-man 2", the title information of movie "Spider-man 2" is displayed in block 404, which includes title, system ID, AKAs ("also known as"), an identification number (e.g., walker number), U.S. release year, and U.S. product Type. Alternatively, other types of Title Information may be included in this field.

In block 406, a list of all the versions of the desired media asset, also referred to as media project, is displayed. For example, as shown in display area 406 of FIG. 4, there are four versions of the media asset, shown as the movie "Spider-man 2", which are ALPHA NAME TBD #1, ALPHA NAME TBD #2, ALPHA NAME TBD #3, and ALPHA NAME TBD #4. Furthermore, in block 406, each version name is followed by four letters, "O", "A" "D" and "S", which indicates the cut information of the corresponding version. For example, ALPHA NAME TBD #1 is a version which is same as the original version, because among the four letters "O", "A" "D" and "S", letter "O" is underlined, which indicates that this version has not been changed from the original version. Similarly, underlined letter "A" indicates that the corresponding version may be changed by adding particular information; underlined letter "D" indicates that the corresponding version may be changed by deleting particular information; and underlined letter "S" indicates that the corresponding version may be changed from the original version by substituting particular information.

Block 408 shows the information of media assets of the version that is filtered based on the search criteria set by the user. As shown in block 408, ALPHA NAME TBD #1 is the filtered version. Pull-down menu 424 shows that the version type/alpha type of the filtered version is "Program". Pull-down menu 426 shows that the version status/alpha status of the filtered version is "Active". Alpha ID 428 indicates the ID number of the desired version in the system is "928945".

Pull-down menu 430 shows that the media type of the filtered version is "Theatrical". Runtime minutes 432 and runtime seconds 434 indicate the length of the desired version is 122 minutes and 2 seconds, respectively. Alpha creator 436 indicates the creator of the desired version. Alpha name 438 shows the name of the desired version is "ALPHA NAME TBD #1". Alpha name AKA 440 shows that the media asset may be known, or referred to by another name or moniker. Pull-down menu 442 shows that the media territory of the filtered version is "Domestic".

Display areas, or regions, 444, 446, 448 and 450 show "Picture" "Audio". "Content" and "Color" components. These components (picture, audio, content and color) represent examples of parameters that can be edited or modified to create a particular version of the media asset that is desired. The edits to the media asset may be categorized and saved and associated with the version of the media asset so that the asset can be easily retrieved at a later time. The use of the metadata ensures the integrity of the asset since the metadata may only be created and/or modified by authorized personnel.

Cut information 452 indicates the cut information of the filtered version, such as "Original", "Add", "Delete" or "Substitute", as described above in relation to block 406. Alpha notes 454 shows specific notes to further describe the filtered version, such as "Scene #1 was deleted for this region".

Figure 5:
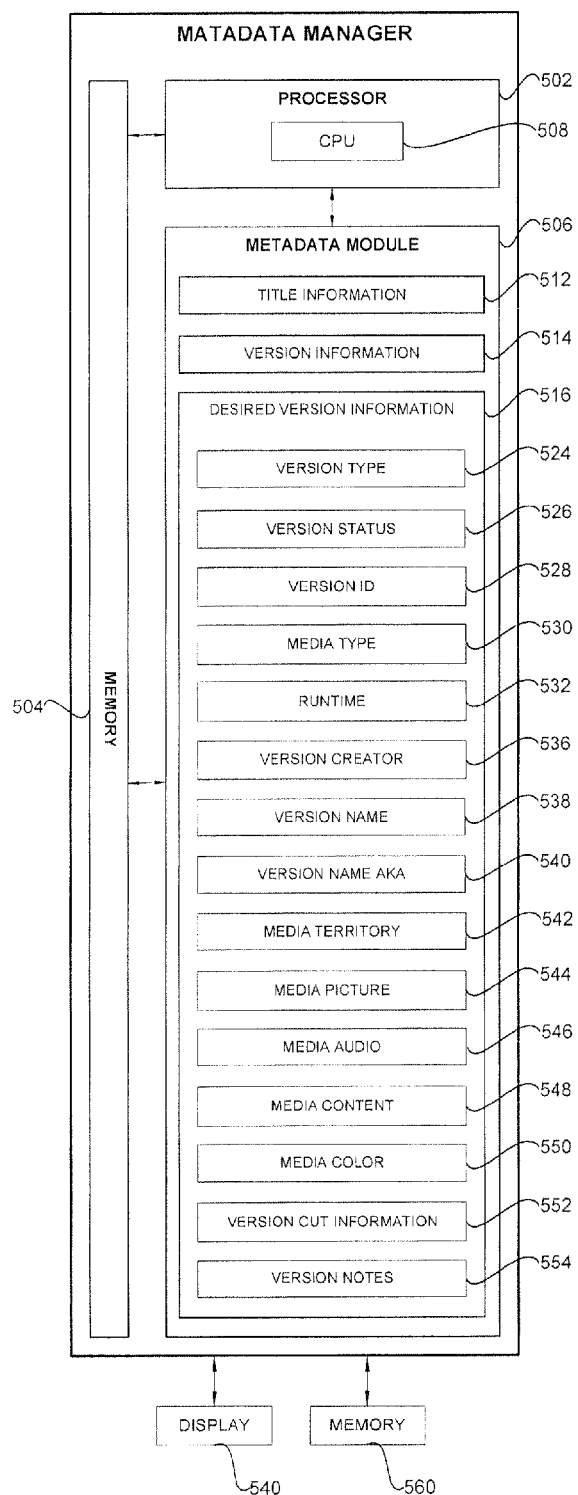
FIG. 5 shows an example of metadata module according to an embodiment of the present invention.

FIG. 5 illustrates an example of a metadata manager module 500 according to an embodiment of the present invention. Metadata manager module 500 includes a processor module 502, a memory module 504 and a manager module 506. The metadata manager module 500 may be a module, "plug-in" unit, stand-alone unit or other facility that resides on another module or device. For example, metadata manager module 500 may be a component of, or executed by: client module(s) 112; server 106; and/or processing module 104, as described herein. Also components of the metadata manager module 500 are display module 540 and remote memory 560.

Processor module 502 is coupled to the manager module 506 via an associated communication link to enable processor module 502 and memory 504 to coordinate processing operations of the modules shown in FIG. 5. The processor module 502 includes a CPU 508, which is typically a processor that includes an arithmetic logic unit (ALU), which performs arithmetic and logical operations, and a control unit (CU), which extracts instructions from memory and decodes and executes them, utilizing the ALU when necessary. An I/O interface may be used to operatively couple the components of processor module 502.

Memory module 504 stores programs, which include, for example, a web browser, algorithms, as well as typical operating system programs (not shown), input/output (I/O) programs (not shown), BIOS programs (not shown) and other programs that facilitate operation of metadata manager module 500. The web browser (not shown) is for example an Internet browser program such as Internet Explorer™. Memory module 504 may be, for example, an electronic storage medium, such as an electronic storage repository that can store data used by metadata management module 500. The memory module 504 may include, for example, RAM, ROM, EEPROM or other memory media, such as an optical disk, optical tape, CD, or a floppy disk, a hard disk, or a removable cartridge, on which digital information is stored in the form of bits. The memory module 504 may also be remote memory coupled to processing module 502 via wired or wireless bi-directional communication medium.

Metadata module 506 includes title information module 512, version information module 514, and desired version information module 516.

Title information module 512 is used to manage and display the title information of the desired media project, as described above in block 404 of FIG. 4.

Version information module 514 is used to manage and display a list of all the versions of the desired media project, as described above in block 406 of FIG. 4.

Desired version information module 516 is used to manage and display metadata of media assets of the desired version, as described above in block 408 of FIG. 4. The desired version information module 516 further includes version type module 524, version status module 526, version ID module 528, media type module 530, runtime module 532, version creator module 536, version name module 538, version name AKA module 540, media territory module 542, media picture module 544, media audio module 546, media content module 548, media color module 550, version cut information module 552, and version notes module 554, which manage and display corresponding metadata as described above in blocks 424-454 of FIG. 4, respectively.

Various embodiments of the embodiments of the present invention will now be described in relation to the description and figures mentioned above. For example, in the present invention, various versions may be represented utilizing different Edit Decision List (EDL). Each EDL contains a list of timecode data, such as time in and time out, to represent where each video clip can be obtained. For example, a modified version of a movie which includes less violent content than the original version may be obtained by creating a new EDL based on the original version of the movie.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device, such as a non-transitory computer-readable medium. The application program can be uploaded to, and executed by, a machine, such as a processor, CPU or compiler, comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method executed by an information processing apparatus for identifying media assets of a media project comprising:
    storing a plurality of versions of media assets of the media project, the plurality of versions of the media assets including an original version and at least one modified version of a particular media asset,
        wherein each of the plurality of versions of the media assets includes a plurality of components, and the at least one modified version of the particular media asset includes at least one modified component that has been modified from a corresponding component of the original version of the particular media asset;
    generating metadata for each of the plurality of components,
        wherein the generated metadata of the at least one modified component indicates at least one type of modification made to the at least one modified component and a difference between the at least one modified component and the corresponding component of the original version of the particular media asset,
        wherein the generated metadata of components of each version of a media asset identifies respective search criteria for a corresponding version of the media asset; presenting the original version and the at least one modified version of the particular media asset from the plurality of versions of the media assets in response to a user's operation of selecting a plurality of attribute search criteria from pull-down menus; and
    retrieving at least one version of the particular media asset in response to selecting metadata of the at least one modified component from the user, wherein the selected metadata of the at least one modified component including at least one modification type from that the at least one type of modification;
        wherein the plurality of attribute search criteria including media type which indicates editing type according to locations where the particular media asset is released, territory which indicates a virtual or actual location for which the particular media asset is edited, picture, audio, content and color.

2. The method as recited in claim 1, wherein the media project is a movie, a television program, audio data, or software.

3. The method as recited in claim 1, wherein the metadata of the at least one modified component includes additional data that describes differences between the at least one modified component and the corresponding component of the original version of the particular media asset.

4. The method as recited in claim 3, wherein the differences include component addition, component deletion and component substitution, and wherein the metadata of the modified component includes information indicating corresponding scenes being added, deleted or substituted during the component addition, the component deletion and the component substitution, respectively.

5. The method as recited in claim 1, further comprising displaying the generated metadata of the at least one modified component.

6. A non-transitory computer readable medium storing a program causing a computer to execute a process for identifying media assets of a media project, the process comprising:
    storing a plurality of versions of media assets of the media project, the plurality of versions of the media assets including an original version and at least one modified version of a particular media asset,
        wherein each of the plurality of versions of the media assets include a plurality of components, and the at least one modified version of the particular media asset include at least on modified component that has been modified from a corresponding component of the original version of the particular media asset;
    generating metadata for each of the plurality of components.
        wherein the generated metadata of the at least one modified component indicates at least one type of modification made to the at least one modified component and a difference between the at least one modified component and the corresponding component of the original version of the particular media asset,
        wherein the generated metadata of components of each version of a media asset identifies respective search criteria for a corresponding version of the media asset,
    presenting the original version and the at least one modified version of the particular media asset from the plurality of versions of the media assets in response to a user's operation of selecting a plurality of attribute search criteria from pull-down menus;
    retrieving at least one version of the particular media asset in response to selecting metadata of the at least one modified component from the user, wherein the selected metadata of the at least one modified component including at least one modification type from the at least one type of modification,
        wherein the plurality of attribute search criteria including media type which indicates editing type according to locations where the particular media asset is released, territory which indicates a virtual or actual location for which the particular media asset is edited, picture, audio, content and color.

7. The non-transitory computer readable medium as recited in claim 6, wherein the media project is a movie, a television program, audio, or software.

8. The non-transitory computer readable medium as recited in claim 6, wherein the metadata of the at least one modified component includes specific notes describing the difference between the at least one modified component and the corresponding component of the original version of the original version of the particular media asset.

9. The method as recited in claim 8, wherein the described difference includes component addition, component deletion and component substitution, and wherein the metadata includes information indicating corresponding scenes being added, deleted or substituted during the component addition, the component deletion and the component substitution, respectively.

* * * * *